United States Patent [19]

Bubar

[11] Patent Number: 5,685,724
[45] Date of Patent: Nov. 11, 1997

[54] SYSTEM OF TEACHING MUSIC

[76] Inventor: David Bubar, P.O. Box 130, Delmar, N.Y. 12054

[21] Appl. No.: 600,854

[22] Filed: Feb. 13, 1996

[51] Int. Cl.⁶ .................................................. G09B 15/02
[52] U.S. Cl. ................................ 434/430; 84/471 R
[58] Field of Search .................... 434/430; 84/471 R, 84/483.1

[56] References Cited

U.S. PATENT DOCUMENTS

| | | | |
|---|---|---|---|
| 2,188,098 | 1/1940 | Bostelman, Jr. | |
| 2,338,426 | 1/1944 | Gloeckler | 434/430 |
| 2,984,143 | 5/1961 | McGinley | |
| 3,208,327 | 9/1965 | Allen | 84/471 R |
| 3,247,751 | 4/1966 | Leonard | 84/471 R |
| 3,616,723 | 11/1971 | Gullickso | |
| 3,903,781 | 9/1975 | Leonard | 84/471 R |
| 4,041,828 | 8/1977 | Leonard | 84/471 R |
| 4,295,407 | 10/1981 | Leonard | 84/471 R |
| 4,465,282 | 8/1984 | Dillon | 434/430 |
| 5,254,008 | 10/1993 | Dawson | 84/471 R |
| 5,392,682 | 2/1995 | McCartney-Hoy | |
| 5,408,914 | 4/1995 | Breitweis, Jr. et al. | |

FOREIGN PATENT DOCUMENTS

| | | |
|---|---|---|
| 553754 | 6/1932 | Germany . |
| 94800 | 10/1955 | Norway . |
| 155144 | 12/1920 | United Kingdom . |

*Primary Examiner*—Paul J. Hirsch
*Attorney, Agent, or Firm*—Schmeiser, Olsen & Watts

[57] ABSTRACT

A method of teaching music and the charts to do so are provided. The method includes the steps of: teaching the student that "every other finger plays every other key"; showing the student the hand placement on the keyboard that will correspond to a given set of indicia; providing a series of charts using the indicia that progressively allow the student to play chords with either hand, a melody with the right hand while playing a chord with the left hand, a multi-key melody with the right hand while playing a chord with the left hand; and finally instructing the student how the sheet music corresponds to the indicia in the charts so that the student can play sheet music.

5 Claims, 4 Drawing Sheets

```
A    MA   ZI   NG   GRACE,    HOW  SWEET    THE  SOUND
G                                    C               G

THAT SAVED      A    WRETCH   LIKE  ME!
G                                   D

I    ONCE     WAS LOST BUT  NOW  AM   FOUND,
G                            C             G

WAS  BLIND,       BUT NOW I    SEE.
G                       D    G
```

FIG. 1

```
D    G    B    G    B         A    G        G    E
A    MA   ZI   NG   GRACE,    HOW  SWEET    THE  SOUND
G                                    C               G

D         G         BG   B         A    D+
THAT      SAVED     A    WRETCH    LIKE ME!
G                                       D

B    D+        BD+B G    D    E    GG E  D
I    ONCE      WAS LOST BUT  NOW   AM   FOUND,
G                              C         G

D    G         BG   B    A    G
WAS  BLIND,    BUT  NOW  I    SEE.
G                        D    G
```

FIG. 2

```
D     G    B   G    B        A    G    G   E
           G        G             E    C        ──48
A    MA   ZI  NG   GRACE,   HOW SWEET THE SOUND
G                                 C         G   ──44
                                          ──45
D     G        BG   B        A    D+
THAT  SAVED    A    WRETCH  LIKE  ME!
G                                 D

B     D+       BD+B G    D    E    GGE   D
G     B        G  G           C    EEC
I     ONCE     WAS LOST BUT  NOW  AM    FOUND,
G                             C          G

D     G        BG   B    A    G
               G    G
WAS  BLIND,    BUT NOW   I   SEE.
G                        D    G
```

*FIG. 3*

```
D     G1   G2  G1   G2       A    CR   C2   GR  ──50
A    MA   ZI  NG   GRACE,   HOW SWEET THE SOUND ──52
G                                 C          G  ──54

GR             G1   G2G1G2   A    D1 ──50    57
THAT  SAVED    A    WRETCH  LIKE  ME! ──52
G                                 D  ──54

B     GR  G1   GR   G1   GR   C2   CRC2GR
I     ONCE     WAS LOST BUT  NOW  AM    FOUND,
G                             C          G

GR   G1        G2   G2   D    G1
WAS  BLIND,    BUT NOW   I   SEE.
G                        D    G
```

*FIG. 4*

SYSTEM OF TEACHING MUSIC

FIELD OF THE INVENTION

The present invention relates generally to the field of education. More specifically, the present invention relates to a systematic series of charts for teaching a person how to play the piano.

BACKGROUND OF THE INVENTION

Although many methods of teaching music exist, there are presently two that are the most common, namely the note reading method (hereinafter "the traditional method") and the Suzuki method. The traditional method of teaching music involves teaching the student how to read music, i.e. the names of the notes, clefs, etc., and then hand placement and fingering, i.e. where the notes are on the instrument and/or which fingers should be used where to play different notes. On a stringed instrument, the student will then progress to using chords, vibrato, and other more advanced techniques.

The Suzuki method involves the teacher playing a few bars or phrases of a piece of music while the student listens. The student is then shown how to play that section and repeats it. The student learns to listen to the music for aspects like whether the notes are going up or down and whether they are stepping or skipping. The teacher plays more phrases and the student mimics the teacher until the entire song is learned and memorized. Eventually, the student is taught to read the notes they are playing until they can play by sight as well as by ear.

The Suzuki method also instructs that this learning should be cumulative, i.e. that a student who has progressed to the second level can still play any songs learned during the first level from memory. Modeling, whereby the more advanced students play the earlier level music for the student at the earlier level instead of the teacher doing so, is used as well.

Additionally, various charts and devices have been developed to make finding the keys, and therefore reading the music, easier. For example, U.S. Pat. No. 2,188,098, issued to Bostelmann, Jr., discloses a chart for piano playing having the sheet music layed out on one level and a series of piano keyboards layed out on other levels. Each piano keyboard shows where each finger should be placed for the corresponding notes, the notes also being shown on the edge of the level, perpendicular to the way the sheet music on the other level is layed out.

Further examples of charts and devices are found in: U.S. Pat. No. 2,984,143, issued to McGinley (laying out which fingers should be positioned where in order to play a chord that is identified only by a name); U.S. Pat. No. 3,430,530, issued to Grindinger (disclosing an illuminated keyboard wherein the various chords are lit when they should be played to go along with the melody line); U.S. Pat. No. 3,616,723, issued to Gullickson (teaching a music system with clips, the clips being temporarily attachable to the keys and having the names of the notes on their face as well as color coding for chords); and U.S. Pat. No. 5,392,682, issued to McCartney-Hoy (disclosing a computerized training device for learning to play the piano, which works by illuminating portions of an optical rod, the portions line up with the proper keys to play, and once the proper keys are played the next keys are illuminated).

The above related art summaries are merely representative of portions of the inventions disclosed in each reference. In no instance should these summaries substitute for a thorough reading of each individual reference. All of the above references are hereby incorporated by reference.

The art at present requires that one basically learn to play the instrument before learning how to read music, therefore limiting one's ability to play music one has not yet heard. Alternatively, the notes are taught first and then how to play the sounds that correspond to the written music. This second method can be rather tedious. Typically only the simple melody is taught first, because of the complexity and coordination involved in reading the sheet music with full chords, thus limiting the students ability to play.

SUMMARY OF THE INVENTION

Accordingly, it is an object of the present invention to provide a method of teaching music by teaching: the axiom "every other finger plays every other key"; showing the student where to place their hands, either by physically placing the fingers on the proper keys or by a chart; showing the student the single letter that represents the chords that they are playing; instructing the student to play a tune as shown in a chart with their right hand holding the single chord until the chord changes in the music while singing along with the tune; instructing the student to play the same tune the same way, except with their left hand; instructing the student to play the same tune the same way, except with both hands; instructing the student to play the melody with the right hand using the middle finger, the melody being printed on a second chart; instructing the student to play the chords of the left hand with the melody of the right hand, this being printed on a third chart; instructing the student to play certain notes or chords an octave higher or an octave lower as indicated in the charts by a plus sign ("+") or a minus sign ("−"); instructing the student to play the melody line in the right hand with two fingers while playing the chords with the left hand, as set out in a fourth chart; teaching the student the chord inversions and instructing the student to play the music with the inversions as shown in a fifth charts; teaching the student the dominant seventh chords and the inversions thereof; and teaching the student to read the music that was initially presented as simple letters.

As can be seen, the method outlined above allows the student to begin playing songs when they are just starting out. The melody line is taught after the chord progression, however, the melody line is filled in when the student sings along with the music, as they are encouraged to do.

It is an advantage that the chords are taught prior to the student's becoming bewildered at the complexity of the chords.

It is a further advantage that the concept of reading music is taught while the student is merely beginning to play.

It is another advantage that the student is taught to read simplistic music at the outset of their learning to play the instrument so that they are introduced to the concept early on and, also, so that they may play any song for which music is printed in this manner regardless of whether the student has ever heard the song before.

Yet another advantage is that the charts are simple and easy to read.

A still further advantage is that the coordination for playing the chords is gained prior to the student's comprehension of the complexity. Additionally, the tediousness of learning to read the music before ever getting a chance to play music is dissipated.

BRIEF DESCRIPTION OF THE DRAWINGS

These and other advantages of the present invention will become more readily apparent upon reading the following detailed description and upon reference to the drawings, in which:

FIG. 1 is an example of a first chart in accordance with a preferred embodiment of the present invention;

FIG. 2 is an example of a second chart in accordance with a preferred embodiment of the present invention;

FIG. 3 is an example of a third chart in accordance with a preferred embodiment of the present invention;

FIG. 4 is an example of a fourth chart in accordance with a preferred embodiment of the present invention;

DETAILED DESCRIPTION OF A PREFERRED EMBODIMENT

Figure 6:
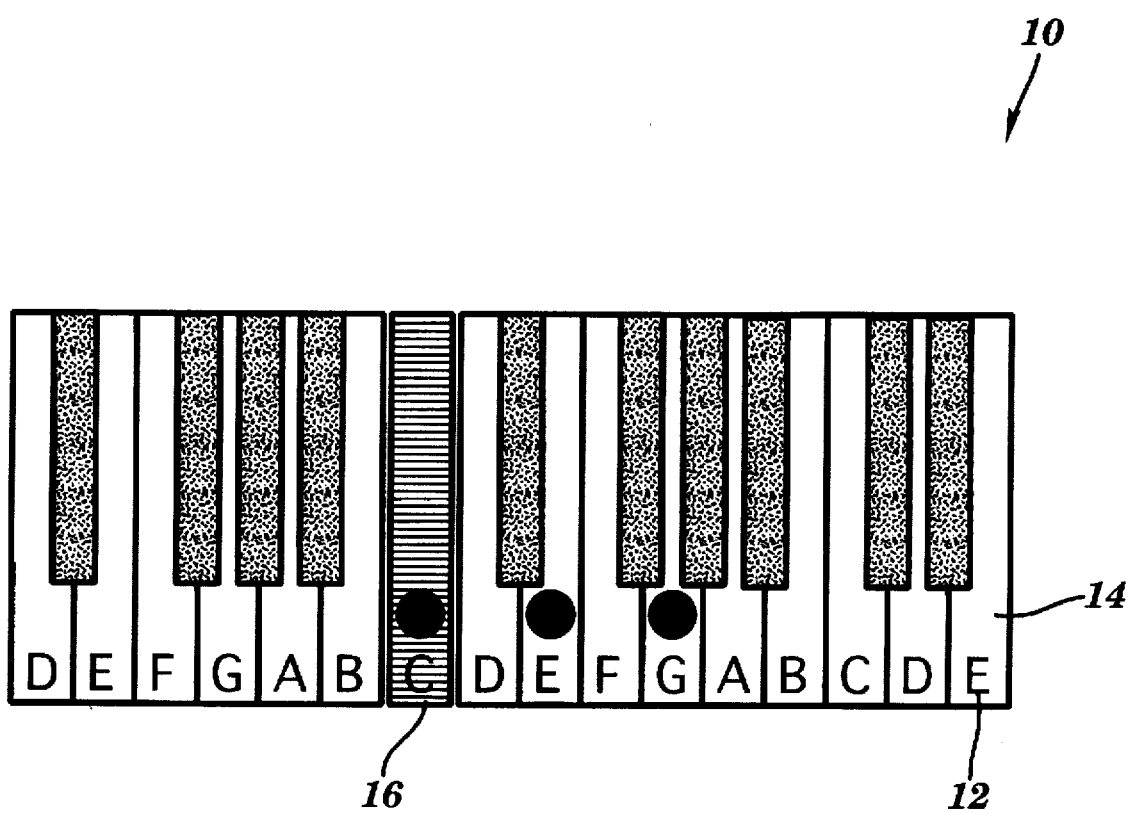
FIG. 6 is one of the fingering charts of the present invention, showing the student where to place their hands on the keyboard.

Referring now to the drawings, specifically FIG. 6, there is shown an example of a fingering chart 10 showing a portion of a piano keyboard, wherein the letters of the notes 12 are printed on the corresponding piano keys 14. Middle C 16 is shaded so that the student knows where the portion of the keyboard is relative to the entire piano. Indicia 18, in this case black dots, are used to show where the fingers should be placed to play a given chord. The chord exemplifies the motto "every other finger plays every other key." The fingers of the student are placed by the instructor on the proper keys. Alternatively, the student may be instructed that middle C 16 is in the middle of the keyboard and the student must then locate middle C 16 his or herself. The concept of eight notes forming an octave is explained as well as the direction of tones going up and tones going down.

Figure 5:
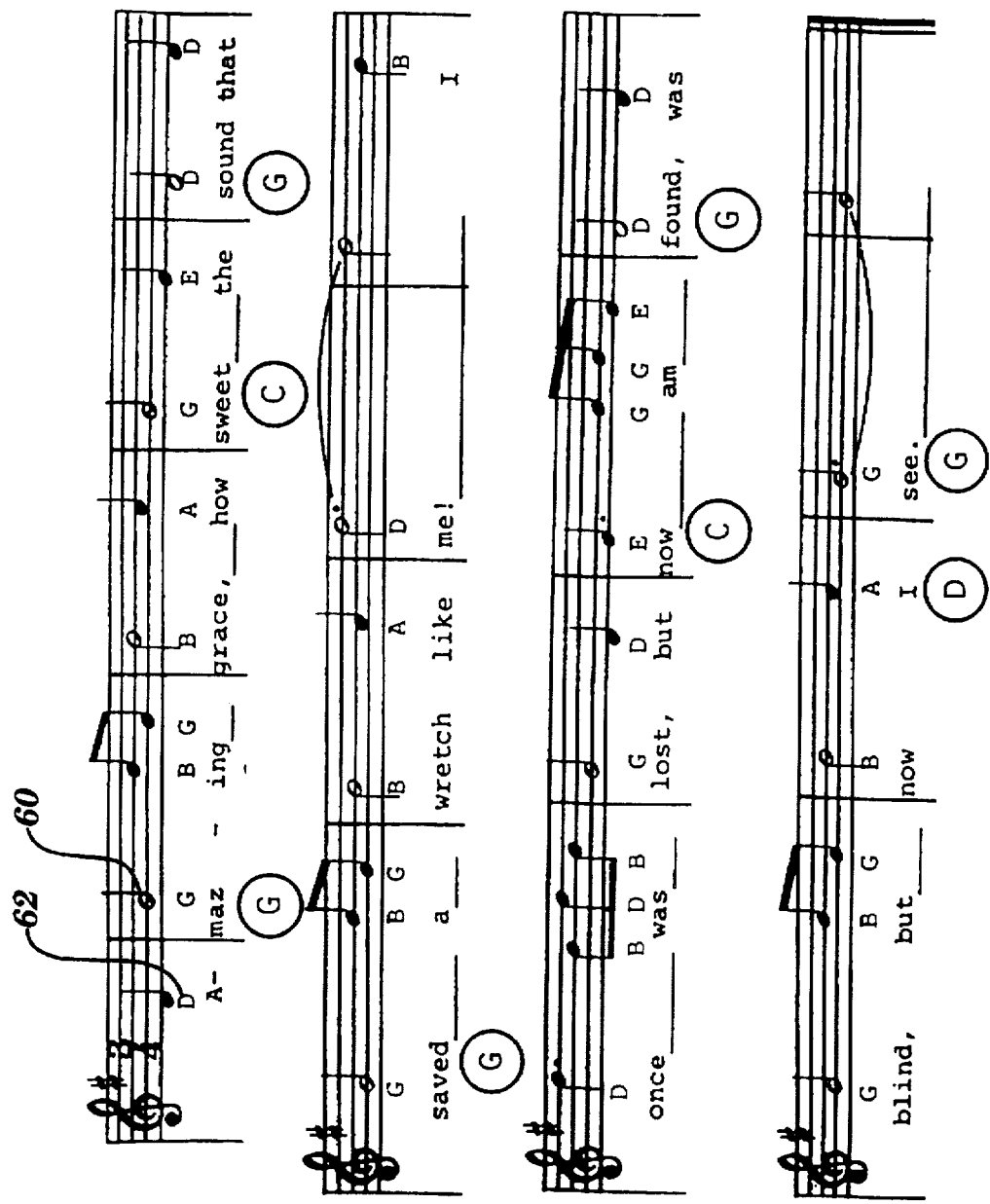
FIG. 5 is an example of a fifth chart in accordance with a preferred embodiment of the present invention.

A series of charts, FIGS. 1-5, outlines the student's progression from the most basic (FIG. 1) to actually reading and playing music (FIG. 5). The steps embodied therein are further described hereinbelow.

The three chords in a key are introduced, in this case the key of C is the first one to be introduced, because it is the simplest. The student is told that every other finger plays every other key and to play all three keys at the same time with the right hand. A first chart, like the one in FIG. 1, is then used to play a song. The first chart comprises a shaded bar 20 over which the words 22 of the music are printed. The shaded bar includes a series of printed letters 24, each letter representing the base note of the chord to be played. The student plays the chord indicated, lifting their hand to play the chord again or to change the chord at each word or each phrase, whichever is indicated. The printed letter may be underlined as an extra prompt that the chord is changing.

The student is then instructed to play the same songs with the left hand and then both hands together. The student is reminded often that "every other finger plays every other key" and that one should use the little finger, middle finger and thumb in that order with the left hand while using the thumb, middle finger and little finger with the right hand. A number of songs are provided in the chart form as shown in FIG. 1, and the student is instructed to listen for chord changes. Next, the student is instructed to play the songs by ear without the chord sheet.

The three chords in the key of F are the next three chords to be introduced. With these chords, B is introduced as well as the concept and locations of sharps and flats. The key of G and the corresponding chords are also introduced (the song shown in FIGS. 1-5 is in the key of G).

The next step is to play the melody in the right hand. The student is instructed to use only the middle finger of the right hand to play the melody line, which is presented in a second chart, as shown in FIG. 2. The second chart includes two grey bars 30, 32 and the words for the song 34. The notes 36 for the right hand melody are located in the upper grey bar 30, above the corresponding words in the song. The chord to be played with the left hand is indicated in the lower grey bar 32 by the corresponding letter 38. Additional indicia 40 are used to show when the note to be played is an octave higher or an octave lower than the octave surrounding middle C. In this chart, a plus sign ("+") 41 is used to indicate that the note should be played up an octave while a minus sign ("−") 42 indicates that the music should be played an octave lower.

The third chart, FIG. 3, shows the next step in the progression. The student learns to play a chord in the left hand while playing two notes at the same time in the right hand's melody. FIG. 3 shows three differently shaded bars, a lower bar 44, located below the lyrics, includes a first letter 45 indicating the chord to be played with the left hand, a first upper bar 46 includes a second letter 47 and a second upper bar 48 including a third letter 49, each of the second and third letters 47, 49 indicating a note to be played with the right hand.

The student is then shown the inversions of the major chord, for example if the chord is a C-chord, the root chord would be played C-E-G in that order. The first inversion of the C-chord is then E-G-C in that order and the second inversion is G-C-E. After showing the student the inversions and labeling them CR for the root C-chord, C1 for the first inversion and C2 for the second inversion, the student is instructed to play the song as shown in FIG. 4. The right hand melody includes full chords 55 and the inversions of the full chords 56 as indicated in the upper grey bar 50 located above the line of lyrics 52. The left hand continues to play the simple chords as indicated by the letters 57 in the lower grey bar 54.

The dominant seventh chords are then introduced, as are the inversions of the dominant seventh chords. The student is encouraged to practice playing the chords. The student is also encouraged to play songs using the little finger of the right hand to play the melody and to fill in the melody line whenever they can by using the middle finger to add a note or the thumb and middle finger to play a triad chord.

The student is then shown a picture of the keyboard with the keys and the corresponding letters printed thereon. The picture further includes a staff and a whole note indicating each line and space. Arrows are drawn from the key on the keyboard to the corresponding note in the staff.

As shown in FIG. 5, the student is next given sheet music showing only the treble clef. Each of the notes to play with the right hand are represented by both a note 60 and a letter 62, as was used previously so the student continues to be able to recognize the familiar indicia while becoming accustomed to reading the music. The left hand continues to play a single chord and this is indicated by a chord letter 64 where the bass clef would be.

The next step in the progression is to provide the bass clef as well as the treble clef with the names of the notes next to them for easy recognition. Finally, the letters are removed and the student is simply reading music.

The embodiments disclosed herein have been discussed for the purpose of familiarizing the reader with the novel aspects of the invention. Although preferred embodiments of the invention have been shown, many changes, modifications and substitutions may be made by one having ordinary skill in the art without necessarily departing from the spirit and scope of the invention as described in the following claims.

Accordingly, what is claimed is:

1. A self-teaching keyboard instrument playing system starting with playing the chords to a familiar song, and using a systematic series of charts which are presented in a logical order of complexity, which self-teaching keyboard instrument playing system comprises:

a first chart having lyrics and a first line of indicia;

a second chart having the lyrics, the first line of indicia and a second line of indicia;

a third chart having the lyrics, the first line of indicia, the second line of indicia, and a third line of indicia;

a fourth chart having the lyrics, the first line of indicia, and the second line of indicia, wherein the second line of indicia includes indicia for at least one chord;

a fifth chart having the lyrics, a treble staff with indicia for at least one note, and a line of indicia for at least one chord.

2. A self-teaching keyboard instrument playing system according to claim 1, wherein the indicia are the letters of the keys.

3. A self-teaching keyboard instrument playing system according to claim 1, wherein the indicia in the first chart each represent a corresponding triad chord.

4. A self-teaching keyboard instrument playing system according to claim 1, wherein the indicia in the fifth chart includes triad chords.

5. A method of teaching music comprising the steps of:

providing a first chart having a single line of indicia and lyrics, said first chart including indicia representing chords;

instructing a student "every other finger plays every other key";

playing a keyboard in accordance with said first chart;

providing a second chart having lyrics, an upper bar of indicia and a lower bar of indicia, said second chart including indicia corresponding to a right hand for each indicium in the upper bar and indicia representing chords corresponding for use by a person's left hand;

providing a third chart having a first upper bar of indicia, a second upper bar of indicia and a lower bar of indicia, said third chart including indicia representing notes in the first and second upper bars corresponding to usage of the right hand and indicia representing chords in the lower bar corresponding to usage of the left hand;

playing the keyboard in accordance with said third chart;

providing a fourth chart having an upper bar of indicia and a lower bar of indicia, wherein the upper bar of indicia includes indicia for a root chord and inversions of the root chord, said fourth chart including indicia corresponding to usage of the right hand in the upper bar and indicia corresponding to usage of the left hand in the lower bar;

playing the keyboard in accordance with said fourth chart;

providing a fifth chart having a treble staff having both notes and indicia, and a line of indicia, said fifth chart including indicia and notes corresponding to usage of the right hand and the line of indicia corresponding to usage of the left hand;

playing the keyboard in accordance with said fifth chart;

providing the treble and a bass clef having both notes and indicia;

instructing the student to play the keys on the keyboard that correspond to the notes in the staff with both hands;

providing a sheet of music without indicia; and instructing the student to play the keys on the keyboard that correspond to the notes on the staff with both hands.

* * * * *